United States Patent
Zhang et al.

(10) Patent No.: US 11,892,731 B2
(45) Date of Patent: Feb. 6, 2024

(54) BACKLIGHT MODULES, DISPLAY PANELS AND DISPLAY APPARATUSES

(71) Applicants: Chongqing BOE Optoelectronics Technology Co., Ltd., Chongqing (CN); BOE Technology Group Co., Ltd., Beijing (CN)

(72) Inventors: Chaojie Zhang, Beijing (CN); Sijun Lei, Beijing (CN); Yansheng Sun, Beijing (CN); Zhi Li, Beijing (CN); Bowen Xiong, Beijing (CN); Qiong Yuan, Beijing (CN); Jing Yu, Beijing (CN); Jing Liu, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 58 days.

(21) Appl. No.: 17/490,824

(22) Filed: Sep. 30, 2021

(65) Prior Publication Data
US 2022/0229333 A1 Jul. 21, 2022

(30) Foreign Application Priority Data
Jan. 18, 2021 (CN) .......................... 202110063127.8

(51) Int. Cl.
G02F 1/1335 (2006.01)
G02F 1/13357 (2006.01)

(52) U.S. Cl.
CPC .. G02F 1/133612 (2021.01); G02F 1/133603 (2013.01)

(58) Field of Classification Search
CPC .. F21V 14/02; G02F 1/1323; G02F 1/133603; G02F 1/133608; G02F 1/133612; G02F 1/133626
See application file for complete search history.

(56) References Cited

U.S. PATENT DOCUMENTS

| | | | | |
|---|---|---|---|---|
| 6,357,893 B1 * | 3/2002 | Belliveau | .............. | F21V 29/677 362/184 |
| 2015/0378212 A1 * | 12/2015 | Jia | ..................... | G02F 1/133603 362/97.1 |

* cited by examiner

Primary Examiner — Tracie Y Green
(74) Attorney, Agent, or Firm — IPro, PLLC

(57) ABSTRACT

Backlight modules, display panels and display apparatuses are provided. A backlight module includes: a flexible light board, provided with a plurality of light-emitting elements arranged at intervals, and provided with a first wire at an edge thereof; a back cover including a base plate, the flexible light board being provided on the base plate, and the base plate being provided with a second wire located on a same side as the first wire; and a controller configured to control a direction of an electric current flowing through the first wire and a direction of an electric current flowing through the second wire, to generate an attractive force or a repulsive force between the first wire and the second wire.

17 Claims, 3 Drawing Sheets

BACKLIGHT MODULES, DISPLAY PANELS AND DISPLAY APPARATUSES

CROSS-REFERENCE TO RELATED APPLICATIONS

The present disclosure claims a priority to Chinese patent application No. 202110063127.8 filed on Jan. 18, 2021 and entitled "BACKLIGHT MODULES, DISPLAY PANELS AND DISPLAY APPARATUSES", which is incorporated herein by reference in its entirety.

TECHNICAL FIELD

The present disclosure relates to the field of display technology, and in particular to a backlight module, a display panel and a display apparatus.

BACKGROUND

With the development of display technology, display apparatuses have been used more and more commonly. In order to prevent leakage of information displayed on a display apparatus when a user uses the display apparatus in public places, a display apparatus with a privacy function has emerged.

SUMMARY

According to a first aspect of embodiments of the present disclosure, there is provided a backlight module, including:
- a flexible light board, provided with a plurality of light-emitting elements arranged at intervals, and provided with a first wire at an edge thereof;
- a back cover including a base plate, the flexible light board being provided on the base plate, and the base plate being provided with a second wire located on a same side as the first wire; and
- a controller configured to control a direction of an electric current flowing through the first wire and a direction of an electric current flowing through the second wire, to generate an attractive force or a repulsive force between the first wire and the second wire.

In an embodiment, in the case that the repulsive force is generated between the first wire and the second wire, the edge of the flexible light board provided with the first wire is bent away from the base plate, such that the flexible light board changes from a flat state to a bent state; and in the case that the attractive force is generated between the first wire and the second wire, the edge of the flexible light board in the bent state moves close to the base plate, such that the flexible light board returns to the flat state.

In an embodiment, the first wire is substantially parallel to the second wire.

In an embodiment, the first wire and the second wire are opposite to each other in a direction from the flexible light board to the base plate.

In an embodiment, the first wire is located on a side of the flexible light board facing the base plate, and the second wire is located on a side of the base plate facing the flexible light board; and the backlight module further includes an insulating layer covering the first wire or the second wire.

In an embodiment, a central area of the flexible light board is fixedly connected with the base plate.

In an embodiment, the flexible light board includes a plurality of edges, and the first wire is provided at each of the plurality of edges.

In an embodiment, the first wire is provided at each of two adjacent edges of the flexible light board, and a cut-out is provided at a corner area of the flexible light board adjacent to the first wire provided at each of the two adjacent edges.

In an embodiment, the controller controls the direction of the electric current flowing through the first wire to remain unchanged, and controls the direction of the electric current flowing through the second wire to change, so as to control switching of the attractive force and the repulsive force between the first wire and the second wire; or the controller controls the direction of the electric current flowing through the second wire to remain unchanged, and controls the direction of the electric current flowing through the first wire to change, so as to control the switching of the attractive force and the repulsive force between the first wire and the second wire.

According to a second aspect of embodiments of the present disclosure, there is provided a display panel including a liquid crystal display module and the backlight module as described above, where the liquid crystal display module is located on a side of the backlight module away from the base plate.

According to a third aspect of embodiments of the present disclosure, there is provided a display apparatus including the display panel as described above.

DETAILED DESCRIPTION

Figure 1:
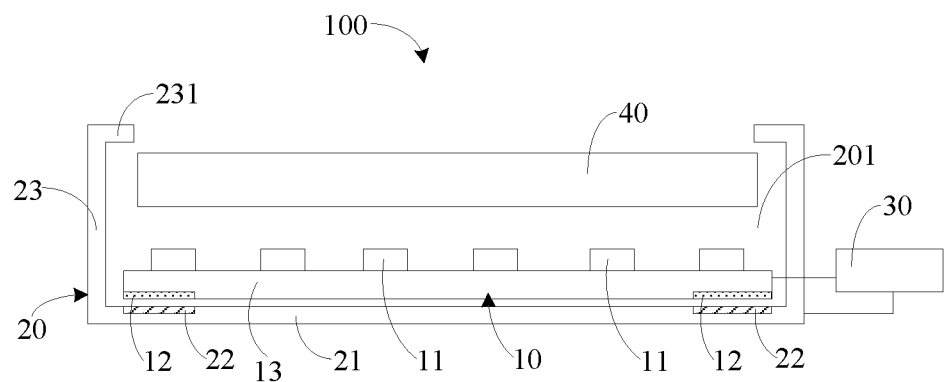
FIG. 1 is a schematic structural diagram illustrating a backlight module according to an exemplary embodiment of the present disclosure in a state.

Exemplary embodiments will be described in detail herein, and examples thereof are illustrated in the drawings. When the following description refers to the drawings, the same numbers in different drawings indicate the same or similar elements, unless otherwise indicated. Implementations described in the following exemplary embodiments do not represent all implementations in accordance with the present disclosure. Rather, they are merely examples of apparatuses in accordance with some aspects of the present disclosure as detailed in the appended claims.

Terms used in the present disclosure are only for the purpose of describing specific embodiments, and are not intended to limit the present disclosure. Singular forms of "a", "said" and "the" used in the present disclosure and the appended claims are also intended to include plural forms, unless the context clearly indicates otherwise. It should also be understood that the term "and/or" as used herein refers to and includes any or all possible combinations of one or more of the associated listed items.

It should be understood that though terms "first", "second", "third", etc. may be used in the present disclosure to describe various information, such information should not be limited by these terms. These terms are only used to distinguish the same type of information from each other. For example, without departing from the scope of the present disclosure, first information may also be referred to as second information, and similarly, second information may also be referred to as first information. Depending on the context, the word "if" as used herein may be interpreted as "when", "upon" or "in response to determining".

An existing display apparatus may realize a privacy function generally through a built-in or external privacy film. However, the display apparatus with the privacy film has a narrow viewing angle and may not be switched to a display state with a wide viewing angle, resulting in a poor user experience when the display apparatus is shared by multiple people.

Embodiments of the present disclosure provide a backlight module, a display panel and a display apparatus. The backlight module, display panel and display apparatus according to the embodiments of the present disclosure will be described in detail below in conjunction with the drawings. Features in the following embodiments may complement each other or be combined with each other without conflict.

Figure 2:
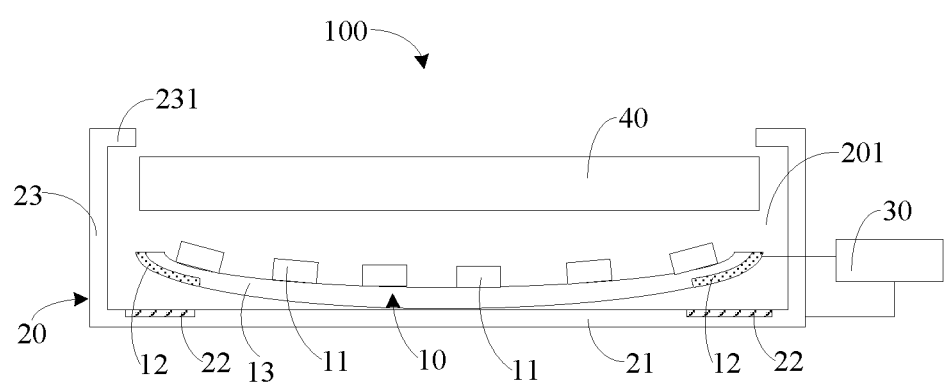
FIG. 2 is a schematic structural diagram illustrating a backlight module according to an exemplary embodiment of the present disclosure in another state.

Embodiments of the present disclosure provide a backlight module. Referring to FIGS. 1 and 2, the backlight module 100 includes a flexible light board 10, a back cover 20, and a controller.

The back cover 20 includes a base plate 21, and the flexible light board 10 is provided on the base plate 21. The flexible light board 10 is provided with a plurality of light-emitting elements 11 arranged at intervals, and provided with a first wire 12 at an edge thereof. The base plate 21 is provided with a second wire 22 located on the same side as the first wire 12. The controller is configured to control a direction of an electric current flowing through the first wire 12 and a direction of an electric current flowing through the second wire 22, to generate an attractive force or a repulsive force between the first wire 12 and the second wire 22.

In the case that the repulsive force is generated between the first wire 12 and the second wire 22, the edge of the flexible light board 10 provided with the first wire 12 is bent away from the base plate 21, such that the flexible light board 10 changes from a flat state as shown in FIG. 1 to a bent state as shown in FIG. 2. In the case that the attractive force is generated between the first wire 12 and the second wire 22, the edge of the flexible light board 10 in the bent state moves close to the base plate 21, such that the flexible light board 10 returns to the flat state as shown in FIG. 1 from the bent state as shown in FIG. 2.

When the edge of the flexible light board 10 provided with the first wire 12 is bent away from the base plate 21, light emitted from the light-emitting elements 11 located at the edge of the flexible light board 10 converges towards the centre, a display panel including the backlight module 100 has a reduced viewing angle, and the display panel is in a privacy state. When the edge of the flexible light board 10 provided with the first wire 12 moves close to the base plate 21 and the flexible light board 10 becomes flat, light emitted from the light-emitting elements 11 located at the edge of the flexible light board 10 diverges to the edge, the display panel including the backlight module 100 has an increased viewing angle, and the display panel is in a sharing state.

In the backlight module according to the embodiments of the present disclosure, when the controller controls the direction of the current flowing through the first wire 12 and the direction of the current flowing through the second wire 22 to generate the repulsive force between the first wire 12 and the second wire 22, the edge of the flexible light board 10 provided with the first wire 12 is bent away from the base plate 21, and the display panel including the backlight module 100 is switched to the privacy state. When the controller controls the direction of the current flowing through the first wire 12 or the direction of the current flowing through the second wire 22 to generate the attractive force between the first wire 12 and the second wire 22, the edge of the flexible light board 10 provided with the first wire 12 moves close to the base plate 21, and the display panel including the backlight module 100 is switched to the sharing state. The backlight module may enable the display panel where it is located to switch between the privacy state and the sharing state, which can better meet the needs of users and improve the user experience. By providing the first wire and the second wire, and using the controller to control the direction of the current flowing through the first wire and the direction of the current flowing through the second wire, the display panel may be switched between the privacy state and the sharing state. Thus, the backlight module has a simple structure, a small thickness, and low cost, and the backlight module is simple to control, can quickly switch between the privacy state and the sharing state of the display panel, and requires low power consumption.

During use of a display apparatus including the backlight module, when a user needs to switch from the sharing state to the privacy state, he/she may send a corresponding control command to the display apparatus through a button or a touch screen of the display panel. The controller controls the direction of the current flowing through the first wire and the direction of the current flowing through the second wire based on the received control command, to generate the repulsive force between the first wire and the second wire, and then the edge of the flexible light board 10 where the first wire is located is bent away from the base plate 21, under the action of the repulsive force. When a user needs to switch from the privacy state to the sharing state, he/she may send a corresponding control command to the display apparatus through a button or a touch screen of the display panel. The controller controls the direction of the current flowing through the first wire or the direction of the current flowing through the second wire based on the received control command, to generate the attractive force between the first wire and the second wire, and then the edge of the flexible light board 10 where the first wire is located moves toward the base plate 21, under the action of the attractive force, and the flexible light board 10 may become flat.

Principle of generation of the attractive and repulsive forces between the first wire and the second wire will be described below.

When an electric current flows through the first wire, a magnetic field may be generated around the first wire. When an electric current flows through the second wire, a magnetic field may be generated around the second wire. The first wire is subjected to an Ampere's force in the magnetic field generated by the second wire. The second wire is subjected to an Ampere's force in the magnetic field generated by the first wire.

Figure 3:
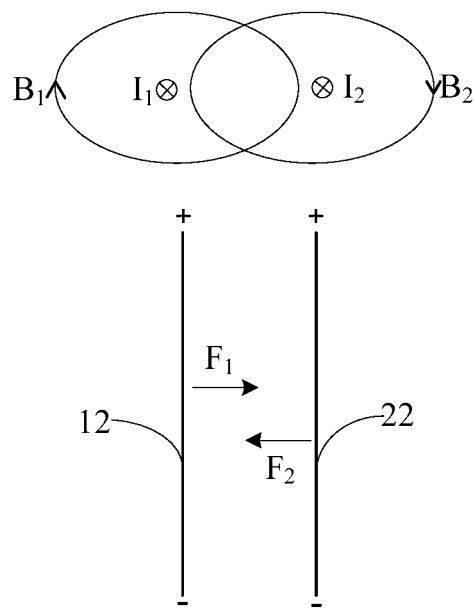
FIG. 3 is a schematic diagram illustrating generation of an attractive force between a first wire and a second wire according to an exemplary embodiment of the present disclosure.

In an embodiment, referring to FIG. 3, when the controller controls the direction of the current $I_1$ flowing through the first wire 12 to be the same as the direction of the current $I_2$ flowing through the second wire 22, a direction of a magnetic induction line $B_1$ of a magnetic field generated by the first wire 12 is the same as a direction of a magnetic induction line $B_2$ of a magnetic field generated by the second wire 22. According to the left-hand rule, the first wire 12 is subjected to an Ampere's force $F_1$ in a direction from the first wire 12 towards the second wire 22, and the second wire 22 is subjected to an Ampere's force $F_2$ in a direction from the second wire 22 towards the first wire 12. That is, the attractive force is generated between the first wire 12 and the second wire 22. The first wire 12 moves closer to the second wire 22 under the action of the Ampere's force $F_1$, such that the edge of the flexible light board 10 changes from the bent state to the flat state.

Figure 4:
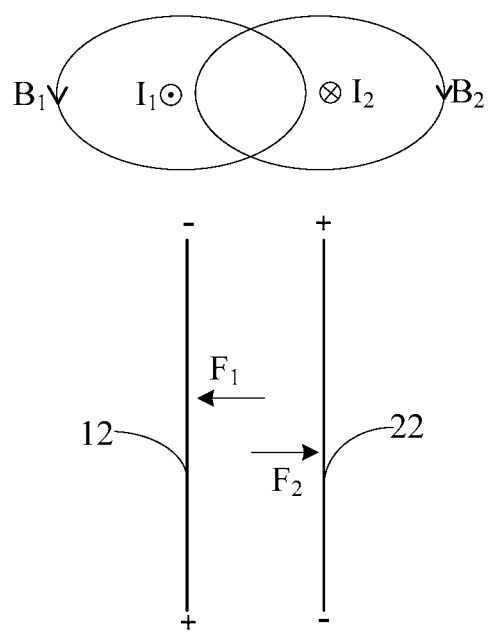
FIG. 4 is a schematic diagram illustrating generation of a repulsive force between a first wire and a second wire according to an exemplary embodiment of the present disclosure.

Referring to FIG. 4, when the controller controls the direction of the current flowing through the first wire 12 to be opposite to the direction of the current $I_2$ flowing through the second wire 22, a direction of a magnetic induction line $B_1$ of a magnetic field generated by the first wire 12 is opposite to a direction of a magnetic induction line $B_2$ of a magnetic field generated by the second wire 22. According to the left-hand rule, the first wire 12 is subjected to an Ampere's force $F_1$ in a direction from the second wire 22 towards the first wire 12, and the second wire 22 is subjected to an Ampere's force $F_2$ in a direction from the first wire 12 towards the second wire 22. That is, the repulsive force is generated between the first wire 12 and the second wire 22. The first wire 12 moves away from the second wire 22 under the action of the Ampere's force $F_1$, such that the edge of the flexible light board 10 changes from the flat state to the bent state.

In the embodiments of the present disclosure, the first wire 12 and the second wire 22 may be made of a metal material with a good electrical conductivity, such as copper and silver.

In an embodiment, the backlight module 100 may further include a circuit board 30, and the controller may be a chip integrated on the circuit board 30. The circuit board 30 may be provided with a power supply circuit, which supplies power to the first wire 12, the second wire 22 and the light-emitting elements 11. The circuit board 30 may also be provided with a switch circuit, which is connected between the power supply circuit and the first wire 12 or the second wire 22. The controller may control the switch circuit to change the direction of the current flowing through the first wire 12 or the second wire 22. The circuit board 30 may be a PCB (Printed Circuit Board). The circuit board 30 may be provided on a side of the back cover 20, that is, on a bezel area of the display panel where the backlight module 100 is located, or the circuit board 30 may be provided on a side of the base plate 21 away from the flexible light board 10.

In an embodiment, the controller controls the direction of the current flowing through the first wire 12 to remain unchanged, and controls the direction of the current flowing through the second wire 22 to change, so as to control switching of the attractive force and the repulsive force between the first wire 12 and the second wire 22. Alternatively, the controller controls the direction of the current flowing through the second wire 22 to remain unchanged, and controls the direction of the current flowing through the first wire 12 to change, so as to control the switching of the attractive force and the repulsive force between the first wire 12 and the second wire 22. In this way, by controlling the direction of the current flowing through one of the first wire 12 and the second wire 22, the flexible light board 10 may be switched between the bent state and the flat state.

In an embodiment, the flexible light board 10 may include a flexible circuit board 13, and the light-emitting elements 11 may be disposed on the flexible circuit board 13. The light-emitting elements 11 may be electrically connected with the circuit board 30 through wiring in the flexible circuit board 13.

In an embodiment, the wiring in the flexible circuit board 13 and the first wire 12 may be formed at the same time. A preparation process of the flexible circuit board may include: providing a first insulating film layer; forming the first wire 12 and the wiring on the first insulating film layer; forming a second insulating film layer covering the first wire 12 and the wiring; and etching the second insulating film layer to expose the first wire 12.

In an embodiment, the first wire 12 of the flexible light board 10 may be substantially parallel to the second wire 22 located on the same side. The first wire 12 being substantially parallel to the second wire 22 may include the first wire 12 being parallel to the second wire 22, and there being a small angle between the first wire 12 and the second wire 22, for example, the angle between the first wire 12 and the second wire 22 is less than 10°. In this way, the attractive and repulsive forces between the first wire 12 and the second wire 22 located on the same side may be made large, which helps to increase a speed of switching between the bent state and the flat state of the edge of the flexible light board 10, thereby shortening time required to switch between the privacy state and the sharing state of the display panel and improving the user experience.

In an embodiment, when the flexible light board 10 is in the flat state, the first wire 12 of the flexible light board 10 and the second wire 22 located on the same side may be opposite to each other in a first direction. The first direction refers to a direction from the flexible light board 10 to the base plate 21. The first wire 12 and the second wire 22 being opposite to each other in the first direction means that a position of the first wire 12 in the first direction roughly corresponds to a position of the second wire 22 in the first direction. In this way, there may be a small distance between the first wire 12 and the second wire 22, the first wire 12 and the second wire 22 may be subjected to high magnetic field strength, and the attractive force or the repulsive force between the first wire 12 and the second wire 22 may be relatively large, which helps to increase a speed of switching between the bent state and the flat state of the edge of the flexible light board 10, thereby shortening time required to switch between the privacy state and the sharing state of the display panel and improving the user experience.

In an embodiment, the first wire 12 may be located on a side of the flexible light board 10 facing the base plate 21, and the second wire 22 may be located on a side of the base plate 21 facing the flexible light board 10. The backlight module 100 may further include an insulating layer (not shown) covering the first wire 12 or the second wire 22. In this way, the first wire 12 and the second wire 22 may have a small distance therebetween, and the attractive force or the repulsive force between the first wire 12 and the second wire 22 may be relatively large, which helps to increase a speed of switching between the bent state and the flat state of the edge of the flexible light board 10, thereby shortening time required to switch between the privacy state and the sharing state of the display panel and improving the user experience.

The insulating layer is provided to prevent the first wire 12 from directly contacting with the second wire 22 to affect the switch between the bent state and the flat state of the edge of the flexible light board 10. The insulating layer has a relatively thin thickness, which basically does not affect the strength of the magnetic field generated by the first wire 12 and the second wire 22.

In an embodiment, a central area of the flexible light board 10 may be fixedly connected with the base plate 21. This may prevent the flexible light board 10 from shifting during the bending of the edge of the flexible light board 10 to affect a display effect of the display panel where the backlight module 100 is located. The central area of the flexible light board 10 may be fixedly connected with the base plate 21 through an adhesive or a connecting member.

Figure 5:
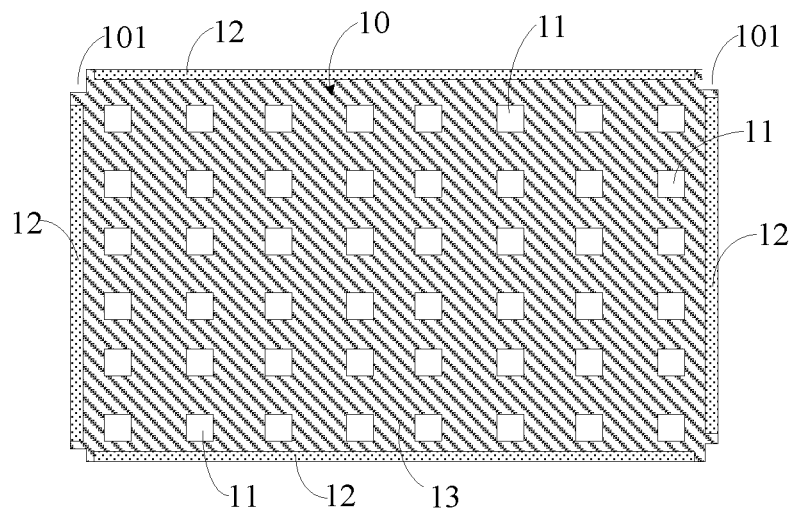
FIG. 5 is a plan view illustrating a flexible light board according to an exemplary embodiment of the present disclosure.

In an embodiment, referring to FIG. 5, the flexible light board 10 may have a rectangular shape. The flexible light board 10 may include a plurality of edges, and the first wire 12 may be provided at each of the plurality of edges. In this way, each edge of the flexible light board 10 may be bent, that is, each edge of the display panel where the backlight module 100 is located may be switched to the privacy state. The user may control any edge of the display panel to switch to the privacy state as needed, which helps to better meet the needs of the user and improve the user experience. The embodiment shown in FIG. 5 only takes the flexible light board having the rectangular shape as an example for illustration. In other embodiments, the flexible light board 10 may have an irregular shape, a circular shape, an oval shapes, etc.

In an embodiment, the first wire 12 may be provided at each of two adjacent edges of the flexible light board 10, and a cut-out 101 may be provided at a corner area of the flexible light board 10 adjacent to the first wire 12 provided at each of the two adjacent edges. When the two adjacent edges of the flexible light board 10 are bent away from the base plate 21 at the same time, the cut-out 101 is provided to prevent wrinkles from occurring in the corner area of the flexible light board 10, such that the adjacent edges of the flexible light board 10 may be smoothly bent away from the base plate 21. The embodiment as shown only takes the cut-out 101 having a rectangular shape as an example for illustration. In practice, the cut-out 101 may have any shape, as long as it may prevent wrinkles from occurring in the corner area when the adjacent edges of the flexible light board 10 are bent away from the base plate 21 at the same time.

In an embodiment, referring back to FIGS. 1 and 2, the backlight module 100 may further include an optical film 40, which is located on a side of the flexible light board 10 away from the base plate 21. The optical film 40 may include a diffusion film, a brightness enhancement film, a light homogenizer, etc. There is a gap between the flexible light board 10 and the optical film 40. The gap allows the edge of the flexible light board 10 to be bent away from the base plate 21 without touching the optical film 40. The gap also allows light emitted from the flexible light board 10 to be mixed before it is incident on the optical film 40 to improve uniformity of light emitted from the backlight module 100.

In an embodiment, the light-emitting element 11 may be a mini LED. In this way, a larger number of light-emitting elements 11 may be provided on the flexible light board 10. A plurality of light-emitting elements 11 may be arranged on the flexible light board 10 at uniform intervals, which is conducive to more uniform distribution of the light-emitting elements 11, thereby improving brightness uniformity of the display panel where the backlight module is located.

In an embodiment, an electrode fixing structure may be provided on the base plate 21 of the back cover 20, and both ends of the second wire 22 may be fixed on the base plate 21 and electrically connected with the circuit board 30 through the electrode fixing structure. The base plate 21 may be insulated from the second wire 22, such that the base plate 21 may not affect the direction of the current in the second wire 22. A groove may be provided in the base plate 21, and the second wire 22 may be accommodated in the groove of the base plate 21, such that when the flexible light board 10 is in the flat state, the bottom of the flexible light board 10 may be flush everywhere, avoiding bulging of an area of the flexible light board 10 corresponding to the second wire 22 in the case where the second wire 22 is provided directly on the base plate 21 to affect uniformity of the light emitted from the light-emitting elements.

In an embodiment, the back cover 20 may further include an enclosure 23 connected with the base plate 21. The enclosure 23 and the base plate 21 may form an accommodating space 201 in which the flexible light board 10 and the optical film 40 are accommodated. The base plate 21 and the enclosure 23 may be integrally formed.

In an embodiment, a side of the enclosure 23 away from the base plate 21 may extend inwardly to form a supporting portion 231 for installing a liquid crystal display module of the display panel where the backlight module is located.

Figure 6:
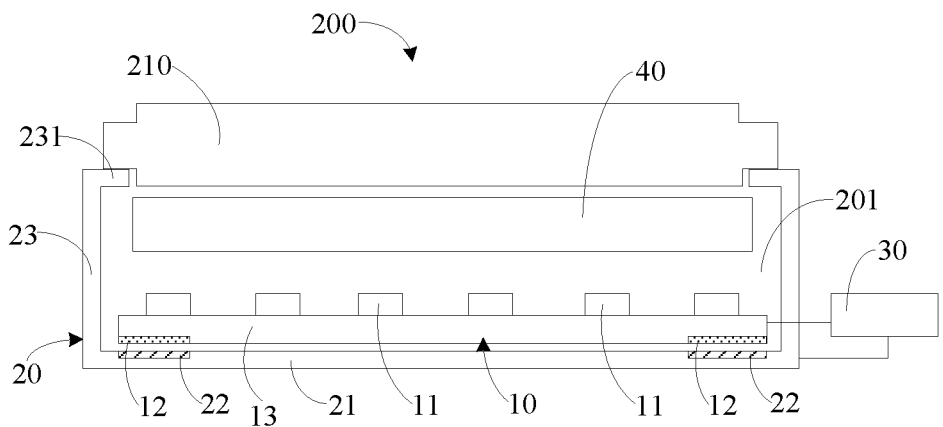
FIG. 6 is a schematic structural diagram illustrating a display panel according to an exemplary embodiment of the present disclosure in a sharing state.
Figure 7:
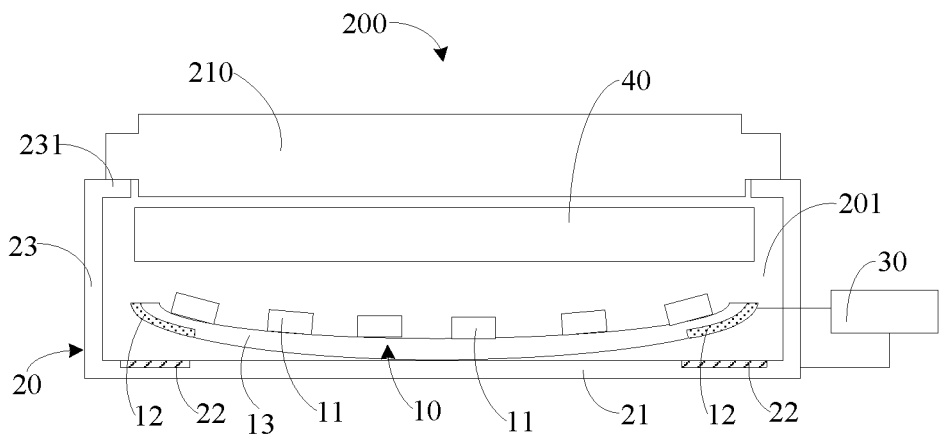
FIG. 7 is a schematic structural diagram illustrating a display panel according to an exemplary embodiment of the present disclosure in a privacy state.

Embodiments of the present disclosure further provide a display panel. Referring to FIGS. 6 and 7, the display panel 200 includes a liquid crystal display module 210 and the backlight module 100 according to any of the embodiments described above. The liquid crystal display module 210 is located on a side of the backlight module 100 away from the base plate 21.

The liquid crystal display module 210 may be installed on the supporting portion 231.

Embodiments of the present disclosure further provide a display apparatus including the display panel according to any of the embodiments described above.

The display apparatus may further include a housing in which the display panel is embedded.

The display apparatus according to the embodiments of the present disclosure may include, for example, a mobile phone, a tablet computer, a television, a notebook computer, a vehicle-mounted device, and any other device with a display function.

It should be pointed out that in the drawings, sizes of layers and areas may be exaggerated for clarity of illustration. It should be understood that when an element or layer is referred to as being "on" another element or layer, it can be directly on the other element or layer, or an intervening element or layer may be present. In addition, it should be understood that when an element or layer is referred to as being "under" another element or layer, it can be directly under the other element or layer, or there may be more than one intervening layer or element. It should also be understood that when a layer or element is referred to as being "between" two layers or two elements, it can be the only layer between the two layers or the two elements, or there may be more than one intervening layer or element. Similar reference numerals indicate similar elements throughout.

Those skilled in the art will easily conceive of other embodiments of the present disclosure after considering the specification and practicing the disclosure disclosed herein. The present disclosure is intended to cover any variations, uses or adaptive changes of the present disclosure. These variations, uses or adaptive changes follow the general principles of the present disclosure and include common knowledge or conventional technical means in the art that are not disclosed by the present disclosure. The specification and the embodiments are to be regarded as exemplary only, and the true scope and spirit of the present disclosure are pointed out by the following claims.

It should be understood that the present disclosure is not limited to the precise structure that has been described above and shown in the drawings, and various modifications and changes may be made without departing from the scope thereof. The scope of the present disclosure is only limited by the appended claims.

The invention claimed is:

1. A backlight module, comprising:
    a flexible light board, provided with a plurality of light-emitting elements arranged at intervals, and provided with a first wire at an edge thereof;
    a back cover comprising a base plate, the flexible light board being provided on the base plate, and the base plate being provided with a second wire located on a same side as the first wire, wherein a groove is provided in the base plate, and the second wire is accommodated in the groove; and
    a controller configured to control a direction of an electric current flowing through the first wire and a direction of an electric current flowing through the second wire, to generate a repulsive force or an attractive force between the first wire and the second wire,
    wherein a central area of the flexible light board is fixedly connected with the base plate, the first wire is provided at each of two adjacent edges of the flexible light board, and a cut-out is provided at a corner area of the flexible light board adjacent to the first wire provided at each of the two adjacent edges.

2. The backlight module according to claim 1, wherein
    the repulsive force is generated between the first wire and the second wire, the edge of the flexible light board provided with the first wire is bent away from the base plate, and the flexible light board changes from a flat state to a bent state; and
    the attractive force is generated between the first wire and the second wire, the edge of the flexible light board in the bent state moves close to the base plate, and the flexible light board returns to the flat state.

3. The backlight module according to claim 1, wherein the first wire is substantially parallel to the second wire.

4. The backlight module according to claim 1, wherein the first wire and the second wire are opposite to each other in a direction from the flexible light board to the base plate.

5. The backlight module according to claim 1, wherein
    the first wire is located on a side of the flexible light board facing the base plate, and the second wire is located on a side of the base plate facing the flexible light board; and
    the backlight module further comprises an insulating layer covering the first wire or the second wire.

6. The backlight module according to claim 1, wherein the flexible light board comprises a plurality of edges, and the first wire is provided at each of the plurality of edges.

7. The backlight module according to claim 1, wherein
    the controller controls the direction of the electric current flowing through the first wire to remain unchanged, and controls the direction of the electric current flowing through the second wire to change, so as to control switching of the attractive force and the repulsive force between the first wire and the second wire; or
    the controller controls the direction of the electric current flowing through the second wire to remain unchanged, and controls the direction of the electric current flowing through the first wire to change, so as to control the switching of the attractive force and the repulsive force between the first wire and the second wire.

8. A display panel, comprising a liquid crystal display module and a backlight module, wherein
    the backlight module comprises:
        a flexible light board, provided with a plurality of light-emitting elements arranged at intervals, and provided with a first wire at an edge thereof;
        a back cover comprising a base plate, the flexible light board being provided on the base plate, and the base plate being provided with a second wire located on a same side as the first wire, wherein a groove is provided in the base plate, and the second wire is accommodated in the groove; and
        a controller configured to control a direction of an electric current flowing through the first wire and a direction of an electric current flowing through the second wire, to generate a repulsive force or an attractive force between the first wire and the second wire,
        wherein a central area of the flexible light board is fixedly connected with the base plate, the first wire is provided at each of two adjacent edges of the flexible light board, and a cut-out is provided at a corner area of the flexible light board adjacent to the first wire provided at each of the two adjacent edges, and
    the liquid crystal display module is located on a side of the backlight module away from the base plate.

9. The display panel according to claim 8, wherein
    the repulsive force is generated between the first wire and the second wire, the edge of the flexible light board provided with the first wire is bent away from the base plate, and the flexible light board changes from a flat state to a bent state; and
    the attractive force is generated between the first wire and the second wire, the edge of the flexible light board in the bent state moves close to the base plate, and the flexible light board returns to the flat state.

10. The display panel according to claim 8, wherein the first wire is substantially parallel to the second wire.

11. The display panel according to claim 8, wherein the first wire and the second wire are opposite to each other in a direction from the flexible light board to the base plate.

12. The display panel according to claim 8, wherein
    the first wire is located on a side of the flexible light board facing the base plate, and the second wire is located on a side of the base plate facing the flexible light board; and
    the backlight module further comprises an insulating layer covering the first wire or the second wire.

13. The display panel according to claim 8, wherein the flexible light board comprises a plurality of edges, and the first wire is provided at each of the plurality of edges.

14. The display panel according to claim 8, wherein
    the controller controls the direction of the electric current flowing through the first wire to remain unchanged, and controls the direction of the electric current flowing through the second wire to change, so as to control switching of the attractive force and the repulsive force between the first wire and the second wire; or
    the controller controls the direction of the electric current flowing through the second wire to remain unchanged, and controls the direction of the electric current flowing through the first wire to change, so as to control the switching of the attractive force and the repulsive force between the first wire and the second wire.

15. A display apparatus, comprising the display panel according to claim 8.

16. The backlight module according to claim 1, wherein
the flexible light board comprises a flexible circuit board, and the plurality of light-emitting elements are disposed on the flexible circuit board, and
wiring in the flexible circuit board and the first wire are arranged in a same layer.

17. The backlight module according to claim 16, wherein the flexible circuit board is prepared by:
providing a first insulating film layer;
forming the first wire and the wiring on the first insulating film layer;
forming a second insulating film layer covering the first wire and the wiring; and
etching the second insulating film layer to expose the first wire.

* * * * *